(12) United States Patent
Hung et al.

(10) Patent No.: US 10,417,738 B2
(45) Date of Patent: Sep. 17, 2019

(54) SYSTEM AND METHOD FOR DISPLAYING GRAPHICAL EFFECTS BASED ON DETERMINED FACIAL POSITIONS

(71) Applicant: Perfect Corp., New Taipei (TW)

(72) Inventors: Hao-Ping Hung, New Taipei (TW); Chih-Chao Ma, Taichung (TW)

(73) Assignee: PERFECT CORP., New Taipei (TW)

( * ) Notice: Subject to any disclaimer, the term of this patent is extended or adjusted under 35 U.S.C. 154(b) by 0 days.

(21) Appl. No.: 15/856,013

(22) Filed: Dec. 27, 2017

(65) Prior Publication Data

US 2018/0197273 A1    Jul. 12, 2018

Related U.S. Application Data

(60) Provisional application No. 62/442,596, filed on Jan. 5, 2017, provisional application No. 62/483,571, filed on Apr. 10, 2017.

(51) Int. Cl.
| | |
|---|---|
| *G06T 3/00* | (2006.01) |
| *G06T 11/60* | (2006.01) |
| *G06K 9/00* | (2006.01) |
| *G06T 19/00* | (2011.01) |

(Continued)

(52) U.S. Cl.
CPC ........ *G06T 3/0081* (2013.01); *G06K 9/00248* (2013.01); *G06K 9/00268* (2013.01); *G06K 9/00281* (2013.01); *G06T 11/60* (2013.01); *G06T 19/006* (2013.01); *G06T 7/32* (2017.01);
(Continued)

(58) Field of Classification Search
CPC ..... G06T 3/0081; G06T 11/60; G06T 19/006; G06K 9/00248; G06K 9/00268; G06K 9/00281
See application file for complete search history.

(56) References Cited

U.S. PATENT DOCUMENTS

| | | | |
|---|---|---|---|
| 6,937,755 B2 | 8/2005 | Orpaz et al. | |
| 7,003,150 B2 | 2/2006 | Trajković | |
| 7,133,658 B2 | 11/2006 | Imagawa et al. | |

(Continued)

FOREIGN PATENT DOCUMENTS

| | | | |
|---|---|---|---|
| CN | 103700106 A | 4/2014 | |
| CN | 103985136 A | 8/2014 | |

(Continued)

*Primary Examiner* — Sarah Lhymn
(74) *Attorney, Agent, or Firm* — McClure, Qualey & Rodack, LLP

(57) ABSTRACT

An electronic device and associated method place a sticker near a facial region in a digital image. The method detects 2D positions of facial features from a 2D digital image, and calculates a projection matrix from a predetermined 3D reference model having predefined facial feature points that correspond to the 2D detected facial features. The method then selects a digital sticker, and for each corner of the selected digital sticker, uses the projection matrix to transform 3D positions of the corner to corresponding positions on the 2D digital image. The method calculates a refinement matrix defining a correlation of each corner of the selected digital sticker to anchor points in the 2D digital image. Using the refinement matrix, the method calculates updated projected 2D positions and displays the selected sticker on the 2D digital image based on the updated projected 2D positions for each corner point.

14 Claims, 5 Drawing Sheets

(51) Int. Cl.
*G06T 7/32* (2017.01)
*G06T 7/33* (2017.01)

(52) U.S. Cl.
CPC .... *G06T 7/344* (2017.01); *G06T 2207/10028* (2013.01); *G06T 2207/30201* (2013.01)

(56) References Cited

U.S. PATENT DOCUMENTS

| | | |
|---|---|---|
| 7,489,324 B2 | 2/2009 | Royal et al. |
| 8,125,485 B2 | 2/2012 | Brown et al. |
| 8,824,808 B2 | 9/2014 | Brandt et al. |
| 9,177,194 B2 | 11/2015 | Sundstrom |
| 9,195,871 B2 | 11/2015 | Zhou et al. |
| 9,224,034 B2 | 12/2015 | Steinberg et al. |
| 9,380,259 B2 | 6/2016 | Totoki |
| 9,466,010 B2 | 10/2016 | Cao et al. |
| 9,519,950 B2 | 12/2016 | Okada et al. |
| 9,524,444 B2 | 12/2016 | Elinas et al. |
| 9,996,797 B1* | 6/2018 | Holz ........................ G06N 5/04 |
| 2004/0125423 A1 | 7/2004 | Nishi et al. |
| 2014/0022249 A1* | 1/2014 | Ye ........................ G06T 13/40 345/420 |
| 2014/0043329 A1* | 2/2014 | Wang ...................... G06T 17/20 345/420 |
| 2014/0347353 A1 | 11/2014 | Popovic et al. |
| 2015/0125049 A1 | 5/2015 | Taigman et al. |
| 2015/0145882 A1* | 5/2015 | Nguyen ................ H04N 1/622 345/589 |
| 2016/0042557 A1 | 2/2016 | Lin et al. |
| 2016/0255303 A1 | 9/2016 | Tokui |
| 2017/0039771 A1* | 2/2017 | Chowdhary .............. G06T 7/73 |
| 2017/0083952 A1* | 3/2017 | Chowdhary ....... G06Q 30/0277 |
| 2018/0005420 A1* | 1/2018 | Bondich ............. G06K 9/00288 |
| 2019/0035149 A1* | 1/2019 | Chen ..................... G06T 15/04 |

FOREIGN PATENT DOCUMENTS

| | | |
|---|---|---|
| CN | 105427297 A | 3/2016 |
| EP | 2779102 A1 | 9/2014 |

\* cited by examiner

SYSTEM AND METHOD FOR DISPLAYING GRAPHICAL EFFECTS BASED ON DETERMINED FACIAL POSITIONS

CROSS-REFERENCE TO RELATED APPLICATION

This application claims priority to, and the benefit of, U.S. Provisional Patent Application entitled, "SYSTEM AND METHOD FOR DISPLAYING GRAPHICAL EFFECTS BASED ON DETERMINED FACIAL POSITIONS," having Ser. No. 62/442,596, filed on Jan. 5, 2017, and U.S. Provisional Patent Application entitled, "METHOD AND APPARATUS OF DISPLAYING STICKER ON MOBILE DEVICE," having Ser. No. 62/483,571, filed on Apr. 10, 2017, which are incorporated by reference in their entireties.

TECHNICAL FIELD

The present disclosure generally relates to application programs for identifying and displaying facial features, and more particularly to application programs that can modify facial images to depict the attachment of objects, images, effects, or stickers to regions of a face.

BACKGROUND

With the proliferation of smartphones, tablets, phablets, and other display devices, people have the ability to take or display digital images virtually any time. Smartphones and other portable display devices are commonly used for a variety of applications, including both business and personal applications. Certain application programs have become popular that allow users to modify images containing pictures of the user or other people. For example, devices may be used to capture or receive digital images (either still images or video images) containing an image of the user's face. The ability to add "fun stickers" is an increasingly popular feature in mobile applications, where a graphical effect or image (e.g., a sticker) is selectable by a user and able to be applied to the image.

To make this feature more interesting, an image (e.g., fun sticker) is often "stuck" onto a facial image in the digital image, where the position and orientation of the sticker corresponds to the position and orientation of the individual's face. For example, the sticker may be a crown placed on the head of the face shown in the image. The state of the art method for incorporating such fun stickers generally involves transformation and rendering. The head orientation is usually estimated by detected feature points to transform the sticker. However, the transformation process is often not precise enough (e.g., a crown sticker, which does not properly rest on the head of the image), which detracts from the "realism" of the coupling of the sticker with the facial image.

Therefore, it is desired to provide an improved method for implementing this feature, without imposing overburdened computations on the device.

SUMMARY

Systems and methods for displaying a sticker near a facial region in a digital image.

In one embodiment, a method is implemented in an electronic device having a processor, memory, and display, the method for displaying a sticker on or around a facial region in a digital image based on facial positions with predefined feature points. The method comprises: detecting 2D positions of facial features from a 2D digital image; calculating a projection matrix from a predetermined 3D reference model having predefined facial feature points that correspond to the 2D detected facial features, the projection matrix defining a correlation of points in 3D space to corresponding points on the 2D digital image; selecting a digital sticker; for each corner of the selected digital sticker, using the projection matrix to transform 3D positions of the corner to corresponding positions on the 2D digital image; calculating a refinement matrix defining a correlation of each corner of the selected digital sticker from the 3D reference model to anchor points in the 2D digital image, wherein the anchor points are a subset of the predefined facial feature points, and specifically the anchor points are a subset of facial feature points being particularly associated with the selected sticker; using the refinement matrix to calculate updated projected 2D positions for each corner of the selected digital sticker in the 2D digital image; and displaying the selected sticker on the 2D digital image based on the updated projected 2D positions for each corner point.

In another embodiment, an electronic device comprises: a processor, a display. And a memory having stored programmed instructions for controlling the processor to perform the following operations: detecting 2D positions of facial features from a 2D digital image; calculating a projection matrix from a predetermined 3D reference model having predefined facial feature points that correspond to the 2D detected facial features, the projection matrix defining a correlation of points in 3D space to corresponding points on the 2D digital image; selecting a digital sticker; for each corner of the selected digital sticker, using the projection matrix to transform 3D positions of the corner to corresponding positions on the 2D digital image; calculating a refinement matrix defining a correlation of each corner of the selected digital sticker from the 3D reference model to anchor points in the 2D digital image, wherein the anchor points are a subset of the predefined facial feature points, and specifically the anchor points are a subset of facial feature points being particularly associated with the selected sticker; using the refinement matrix to calculate updated projected 2D positions for each corner of the selected digital sticker in the 2D digital image; and displaying the selected sticker on the 2D digital image based on the updated projected 2D positions for each corner point.

In another embodiment, a method is implemented in a media editing device for displaying a sticker based on face positions with predefined anchor features. The method comprises: detecting 2D positions of at least four facial features from the picture captured by the camera of the mobile device; calculating the transformation matrix from the predefined 3D feature positions to corresponding 2D positions of detected features; for each corner of the sticker, calculating the 3D position; for each corner of the sticker, transforming the 3D position to 2D position according the transformation matrix; calculate the first warping matrix according to the transformed 2D positions of the corners; calculating the projected 2D anchor feature positions from predefined 3D anchor feature positions using the transformation matrix; calculating the second warping matrix according to the detected 2D positions of the predefined anchor features and the projected 2D anchor feature positions; and warping the sticker according to the first warping matrix and second warping matrix.

BRIEF DESCRIPTION OF THE DRAWINGS

Various aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The following description is of certain embodiments of a novel invention that applies digital images or effects (also referred to herein as "stickers") to a facial region of a digital image. As will be described herein, the invention employs a novel approach that implements a basic two-step approach, which first applies a global transformation matrix and thereafter applies a local refinement matrix in order to achieve better quality and more realistic placement of the sticker than existing methods, while being computationally efficient.

The disclosed algorithm is capable of rotating a sticker according to a rotating angle in the x/y/z axes (e.g., to properly align with the position and direction of the face in the digital image). Given a particular sticker (e.g., an image depicting eyeglasses), the procedure of rendering the sticker onto the digital facial image of the user with preferred position and orientation is performed as described hereinbelow. For illustrative purposes, the following description will describe the invention in the context of a sticker comprising an image of a pair of eyeglasses (e.g., to be presented across a user's eyes, and over the user's nose). It will be appreciated, however, that the concepts of the invention described herein equally apply to other types of stickers as well (e.g., hats, ear-muffs, ear-rings, facial masks, whiskers, horns, etc.). In this regard, persons of ordinary skill in the art will readily appreciate and understand the applicability and implementation of the invention with other types of stickers, from the description provided hereinbelow.

A typical implementation of the present invention will be in the form of an application program running on an electronic device, such as a cell phone, phablet, tablet, personal computer, etc. As is known, users frequently communicate via a video link between electronic devices (e.g., SKYPE®, FACETIME®, etc.). Likewise, a user can use other application programs to take selfie pictures or videos. The present invention can be used in cooperation with a program such as these, to provide add-on features for user entertainment. In this regard, the user can select one or more of a variety of pre-stocked or pre-defined stickers to apply to a facial region of a digital image (e.g., the user's face, or that of another person, being presented on the user's electronic device). Once the sticker(s) is(are) selected, the invention applies the sticker to the appropriate location of the image, and will move the sticker along with a face in the image, as the face/head is moved in a video (e.g., the movement encompassing all three axes).

Figure 1:
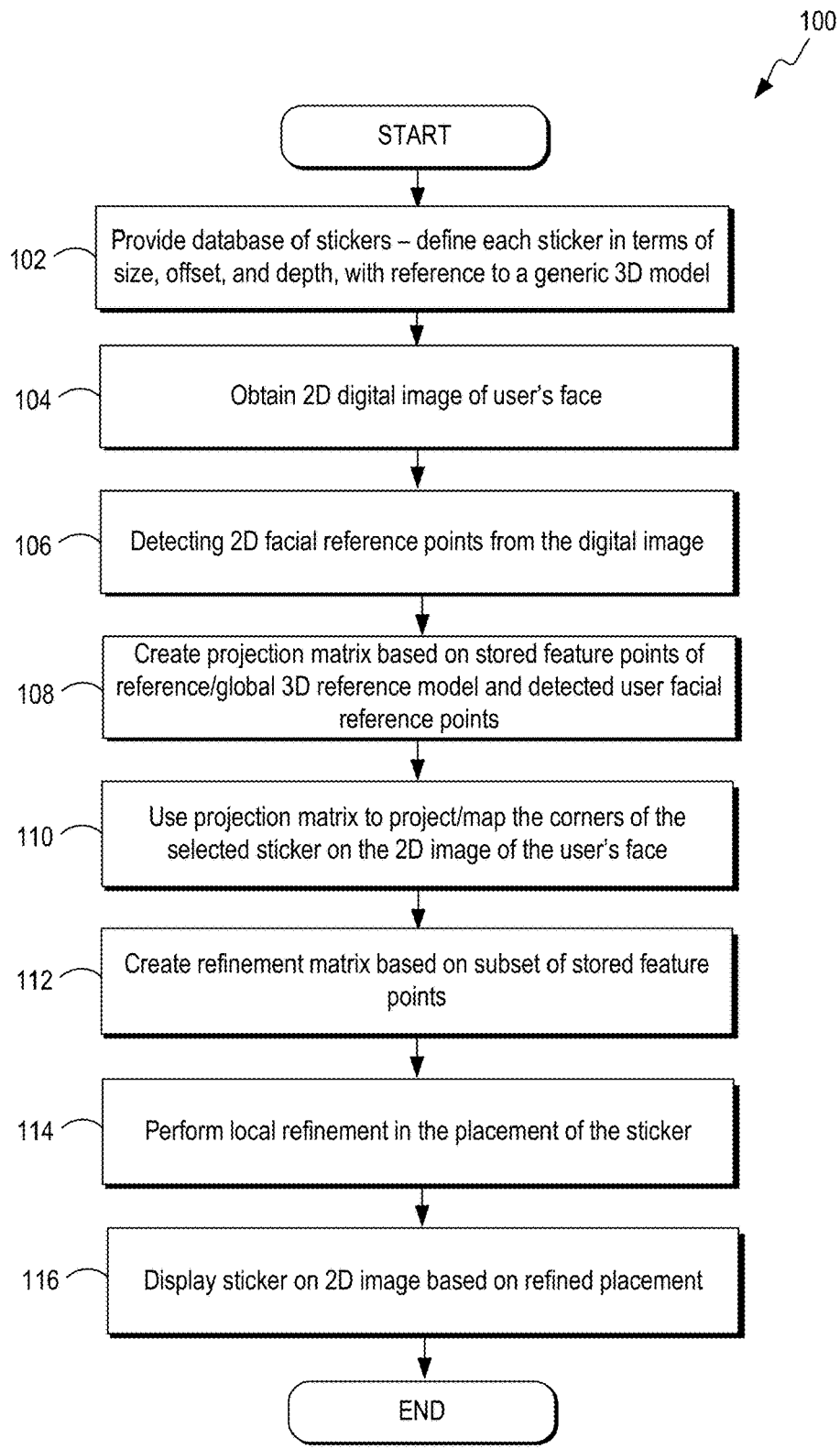
FIG. 1 is a flowchart illustrating operations of an embodiment of the invention.

Reference is made to FIG. 1, which is a flowchart 100 showing the basic steps and operations performed in an embodiment of the present invention. A first step (102) involves the initial design of the stickers to be used. In a preferred embodiment, for computational simplicity, each sticker is treated as a four-corner rectangle. In the design phase, the sticker is defined in terms of its size, offset, and depth. The initial size is defined in terms of (or with reference to) a single/generic 3D reference model. The offset is a distance (for each of the four reference corners of the sticker) from a corresponding facial feature point. Finally, the depth value represents a separation distance between the sticker and the face of the reference model.

Figure 2:
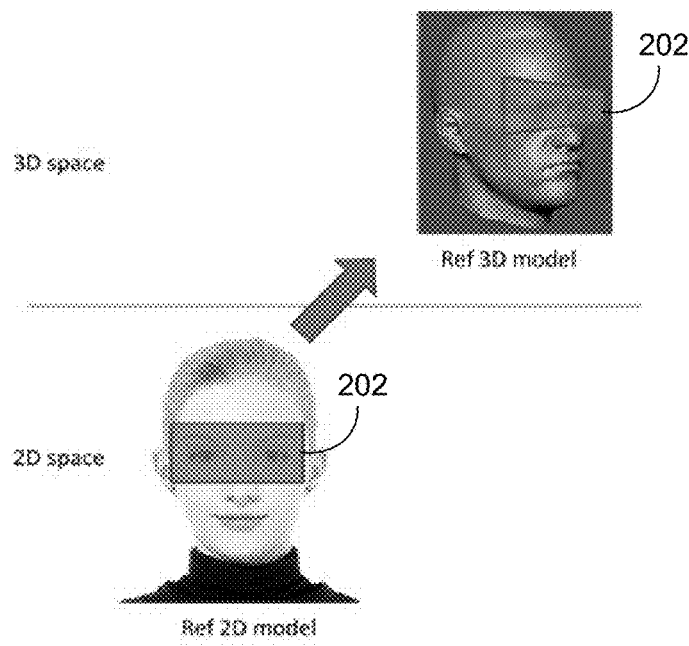
FIG. 2 is a diagram illustrating the projection/transformation between a 3D reference model and a 2D image of a user.

For example, consider the case of the sticker being a pair of eyeglasses or sunglasses. As is known, such glasses are worn over a user's eyes, and span across the bridge of the user's nose. Reference is made briefly to FIG. 2, which illustrates an eyeglass sticker 202 in the form of a 4-point rectangle. Specifically, FIG. 2 represents the sticker 202 as positioned in both 2D and 3D space, with the 3D space model being in relation to a single generic 3D model.

It is noted that the reference 2D model and the reference 3D model may be in different scales. Thus, the sticker image is resized before putting it in the correct position related to the reference 3D model. This can be done by using the distance between two eyes to determine the resize ratio. For other stickers, other points can be used as appropriate reference points for the resizing operation.

Returning to the illustration involving eyeglasses, the distance between two eyes in reference 2D model can be defined as dist_2d, and the distance between two eyes in reference 3D model can be defined as dist_3d, respectively. From this, a resize ratio (resize_ratio) of the sticker can be calculated as dist_3d/dist_2d. Next, the center of the sticker in 3D space is determined. Then, to locate the position of four sticker corners in the reference 3D model, their relative positions to the face center is used. The face center is determined as the middle point between left eye center and right eye center.

In 2D space, a vector from a facial center to a top-left corner of the sticker is (vx_2D, vy_2D). In 3D space, the vector from the facial center to top-left corner can be calculated as (vx_3d, vy_3d)=(vx_2d*resize_ratio, vy_2d*resize_ratio). As will be understood by persons skilled in the art, the facial center of the reference 3D model is known as (cx, cy), the top-left corner of the sticker in 3D space can be obtained as (px, py)=(cx+vx_2b*resize_ratio, cy+vy_2d*resize_ratio). The other three corners of the sticker (i.e., right-top, left-bottom, right-bottom) can be determined using a similar method.

As for the position at z-axis for four corners, the distance between eyes and nose tip can be used as the reference distance. When the sticker is designed, the designer will determine the sticker's depth value in 3D space using a value between (0 and 1). In this regard, a depth value of 0 (zero) means that the sticker is located at the same position of the eye in z-axis. A depth value of 1 means that the sticker is located at the same position of the nose tip on the z-axis.

Given the depth value d, its position along z-axis of the 3D space can be calculated as pz=eye_z+d*(nose_z−eye_z).

Figure 3:
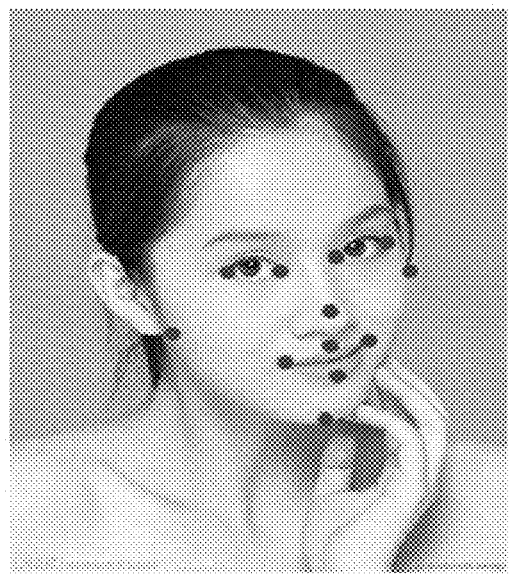
FIG. 3 illustrates an image of a particular user and identified reference facial feature points, in accordance with an embodiment of the invention.

FIG. 3 shows a hypothetical user, and the various facial reference points utilized by one embodiment of the invention. As illustrated, in this implementation, there is a single reference point for the tip of the chin, one reference point for each ear (whether the point of the ear just above the lobe contacts the face), two reference points for each eye (one at each eye corner), a single reference point at the tip of the nose, and four reference points for the mouth (one at each corner, one at the center-point of the upper lip, and one at the center-point of the lower lip.

The method of retrieving or determining facial-feature point positions is called facial alignment. This facial alignment is known and understood by persons skilled in the art, and therefore need not be described in detail herein. Generally, facial alignment is a training-base mechanism. In the beginning, thousands of facial photos are collected and tagged with the correct face feature positions as "ground truth". Next, machine learning is used to learn the properties of these features. For example, for an eye tail corner, the neighboring pixel pair may cause large difference since one pixel is located in eye region and the other is located in skin region. By collecting these properties throughout the input photos, a "learning model" is generated. When an unknown photo (i.e., a photo or digital image containing the user's face), the model can be used to determine the face feature positions of the user.

Returning to the illustration of FIG. 3, it will be appreciated by persons skilled in the art that additional (or fewer) reference points could be utilized and illustrated in FIG. 3. For example, additional reference points could be used to further define the boundaries of the user's ears, the top of the user's head, the user's hairline, etc.) Other reference points may also be defined, depending upon the various stickers that are designed for use with the invention. It should be appreciated that the scope and spirit of the invention is not limited by the particular placement or number of reference points.

According to the scale/size, offset of each sticker corner, and depth information, the four corners of the sticker 202 may be readily transformed into 3D space, with reference to the 3D model, using a global transformation process or operation. In this regard, the global transformation operation refers to the transformation of a 2D image (e.g., sticker or user's face) into 3D space, through the use of a single transformation matrix that is based on a generic 3D reference model of a human face/head. As the facial feature of any given user will not map precisely to the corresponding features of the predefined 3D reference model, the global transformation process is performed to make this appropriate mapping. Note that relative positions between 3D corners and the 3D model feature points should be the same as the relative positions between 2D corners and the 2D model feature points. Again, FIG. 2 shows an example of determining the sticker corner positions in 3D space.

Returning to FIG. 1, after the stickers are designed, an electronic device obtains a 2D digital image of a user's face (104). This image could be a still image or a video image. Further, the electronic device could obtain the image by directly capturing it via an integrated camera, by retrieving it from stored memory, or by having the image electronically communicated to it. The description herein will generally refer to the "user's" face. However, it will be appreciated that, for certain applications, the image could contain the image of another person's face (i.e., someone other than the user).

After obtaining the 2D digital image of the user's face, the 2D positions of several important (pre-defined) facial features (or reference points) such as the corner of eyes, the nose tip, and the corners of mouth are detected (106). Again, FIG. 3 shows such references points, of a given facial image, as utilized in one embodiment of the present invention.

Figure 4:
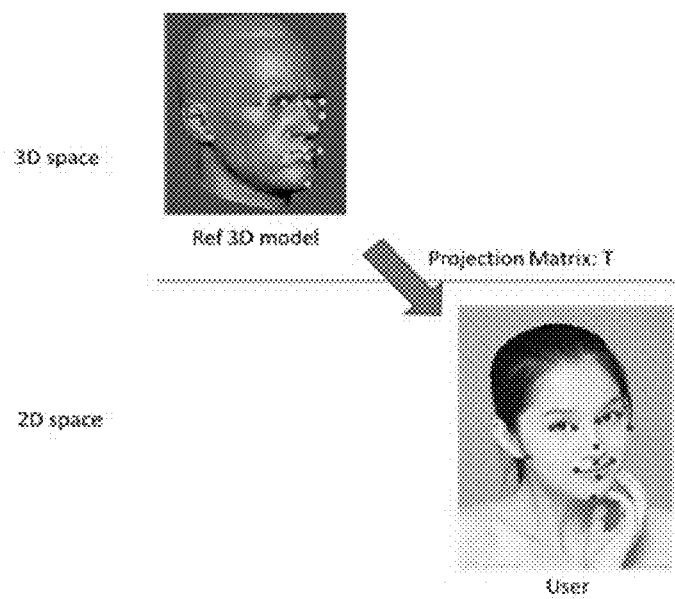
FIG. 4 is a diagram showing the projection of pre-defined facial features points from a 3D reference model to a 2D image of a particular user's facial image.

For the reference 3D model, there is a set of predetermined 3D feature points that correspond to these same detected facial features of the user. With the 3D feature points of the reference model and 2D feature points detected from the user, a projection matrix is created (step 108) and used to convert from 3D space to 2D space. That is, the created projection matrix (which is unique to each user) is used to project (or map) the stored reference points from the reference 3D model to the 2D user facial region (see FIG. 4).

As will be appreciated by persons skilled in the art, there are a number of third party libraries released for solving or computing a projection matrix from 3D space to 2D space. In a preferred embodiment, the OpenCV (Open Source Computer Vision) library is used directly to obtain the projection matrix. As is known by persons skilled in the art, OpenCV has C++, C, Python and Java interfaces and supports Windows, Linux, Mac OS, iOS and Android. OpenCV was designed for computational efficiency and with a strong focus on real-time applications. Written in optimized C/C++, the library can take advantage of multi-core processing. Enabled with OpenCL, it can take advantage of the hardware acceleration of the underlying heterogeneous compute platform. Persons skilled in the art will readily understand how to generate and use a projection matrix, as described herein, using OpenCV, or other appropriate or comparable resources.

Figure 5:
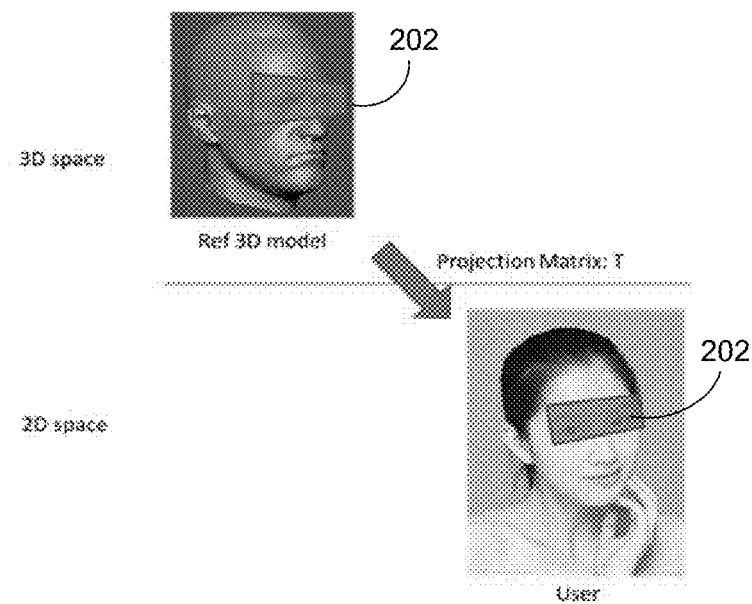
FIG. 5 is a diagram illustrating the projection of a pre-defined rectangular sticker from the 3D reference model on a 2D image of a particular user's facial image.

Using the created projection matrix, the corners of the selected sticker are projected from 3D space (from the 3D reference model) to the 2D image of the user's face (step 110). That is, in the design stage (step 102), each corner point of each given sticker 202 is positioned in a predefined position on the 3D reference model (based on size/scale, offset, and depth values). The projection matrix is used to project (or map) each of these points to a corresponding point on the 2D facial image of the user (see FIG. 5).

For example, consider a 3D point as (px, py, pz), and the projection matrix as $$T = \begin{bmatrix} t11 & \cdots & t14 \\ \vdots & \ddots & \vdots \\ t31 & \cdots & t34 \end{bmatrix},$$

the projected 2D point (qx, qy) can be calculated as qx=(t11*px+t12*py+t13*pz+t14)/K and qy=(t21*px+t22*py+t23*pz+t24)/K, where K=(t31*px+t32*py+t33*pz+t34)/K.

Since the projection matrix is constructed by all of the reference facial-feature points, certain minor projection errors may result for given ones of these feature points. Taking the sticker comprising eyeglasses as an example, a projection error in relation to the eye features (e.g., the corners of the eyes) may cause the sticker to be inaccurately projected onto the 2D image of the user's eye region. To compensate for such projection errors, a local refinement process is applied in order to improve the accuracy of the placement of the projected sticker onto the individual user's face (step 112).

As will be understood by persons skilled in the art, the error occurs because the 3D model is a generic model, and each user has different facial shape or differences in their facial features with respect to the generic 3D model. Thus, the 3D model does not exactly match with individual users. For persons whose face is more similar to the generic 3D model, the error is smaller, and vice versa.

With regard to this refinement step, for any given sticker, a set of anchor points is defined, which relate to the specific sticker. In the example of an eyeglass sticker, the anchor points are the eye feature points (i.e., the corners of the eyes). For example, the anchor point is the coordinate/position of eye feature points, or the subset is calculated from a weighted average of the positions of the eye features points. Once the sticker is projected onto 2D space, using the projection matrix, an additional refinement matrix is constructed according to the projected eye feature points and detected eye feature points (step 112) so that the projection errors around the eye feature points are minimized. That is, by generating the refinement matrix using only the anchor points, the computed refinement matrix results in more accurate placement of the sticker.

More specifically, when the designer designs the stickers, he/she should also determine at least one anchor point associated with each sticker. The anchor points indicate the positions that a user most cares about using the particular sticker. For example, for an eye glass sticker, the anchor points should be near the eyes; for a moustache sticker, the anchor points should be near the mouth (and the area between the mouth and tip of the nose; etc. Given the anchor points, the projection matrix is adjusted to make the anchor points have higher projection accuracy. It is noted that the projection matrix is determined by using a global optimization method. The overall projection errors should ideally be minimized. Using the refinement method of the present invention, the projection errors of anchor points will become smaller, whereas other points will have larger errors. However, by reducing the errors in the area(s) relevant to a particular sticker, to have larger errors at other locations will be inconsequential. For example, in the example of the eyeglass sticker, having larger errors in the area of the mouth will be inconsequential to the placement of the sticker around the eyes.

Thus, to adjust the projection matrix, an additional 3×3 matrix (herein called the refinement matrix) is used. The refinement matrix can be determined by solving the homography by considering the pairs [(a1$x$, a1$y$), (d1$x$, d1$y$)] . . . [(a$nx$, a$ny$), (d$nx$, d$ny$)], where n is the number of anchor points; (a$x$, a$y$) is the projected point of the anchor point of reference 3D model; the (d$x$, d$y$) represents the detected points of the user. For example, if the anchor point is the left eye center, since the reference 3D model is known, the (a$x$, a$y$) can be determined using the projection formula described above. The point (d$x$, d$y$) can be retrieved during the tracking procedure of the user. Using a linear regression technique, a 3×3 matrix can be derived so that the (a$x$, a$y$) point can be transformed to (d$x$, d$y$), so that the projection errors of the anchor points can further be minimized. Finally, the projection matrix can be refined as T'=T⊙H, where the T' is the refined projection matrix, T is the original projection matrix, H is the refinement homography, and ⊙ is the matrix multiply operator.

Figure 6:
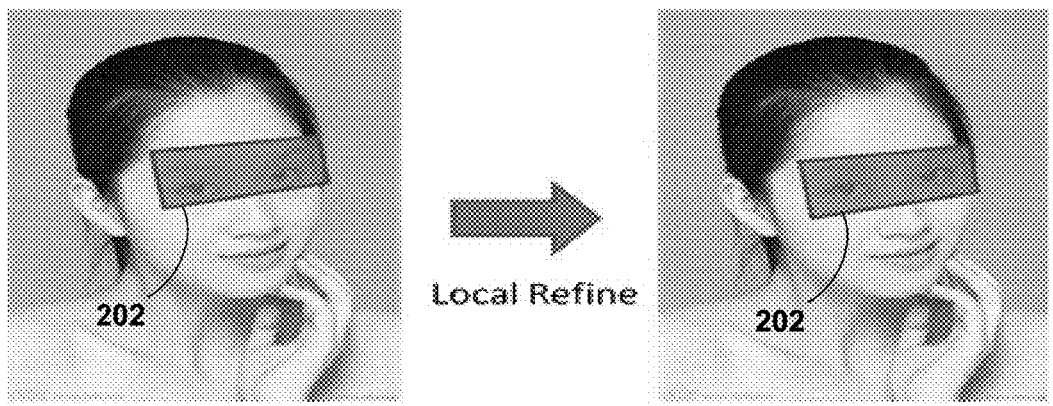
FIG. 6 is a diagram illustrating a refinement in the projected position of the sticker on the 2D image of the particularly user's facial image.

As shown in FIG. 6, projection errors of the eye feature points can result in a slightly inaccurate position of the sticker (e.g., eyeglasses not positioned precisely in the position over the eyes that they are supposed to be). Therefore, the created refinement matrix is use to perform a refinement of the positioning of the corners of the sticker 202, to provide a more accurate placement of the sticker 202 on the 2D image (step 114). The refinement matrix is used to refine the position of the 2D projected corners of the sticker. This refinement is not in the 3D model.

After performing the local refinement via the refinement matrix, the sticker is displayed on the 2D image, based on the refined placement of the corner points (step 116).

Figure 7:
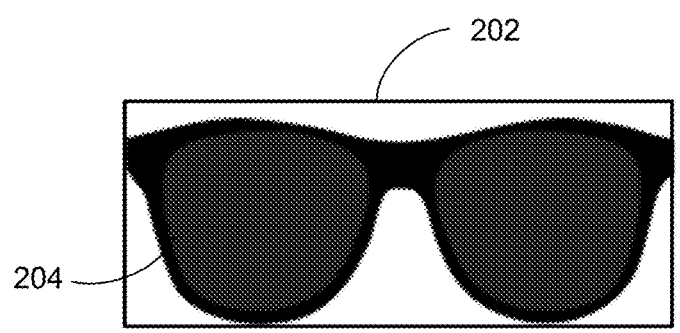
FIG. 7 illustrates how an image (e.g., sunglasses) may be mapped onto a rectangular sticker defined by four corner points.

As described above, one embodiment/implementation of the invention treats all stickers as simple four-corner rectangular objects, thereby limiting the transformation computations to a relatively small number of points. As shown in FIG. 7, in practice a more detailed image 204 (e.g., sunglasses) can be rendered onto the sticker 202, with areas outside the image 204 (but inside the rectangular boundaries of the sticker 202) are rendered as transparent. This will result in a more realistic image of the sticker being displayed in the facial region, while the placement computations have been based on only four points. However, consistent with the scope and spirit of the invention, a sticker 202 may be defined by more than four corner points. Doing so, would add computations, but could result in greater placement accuracy. Likewise, consistent with the scope and spirit of the invention, additional reference points of facial features may be defined, and utilized, based on a balance of desired placement accuracy and simplified computations.

Figure 8:
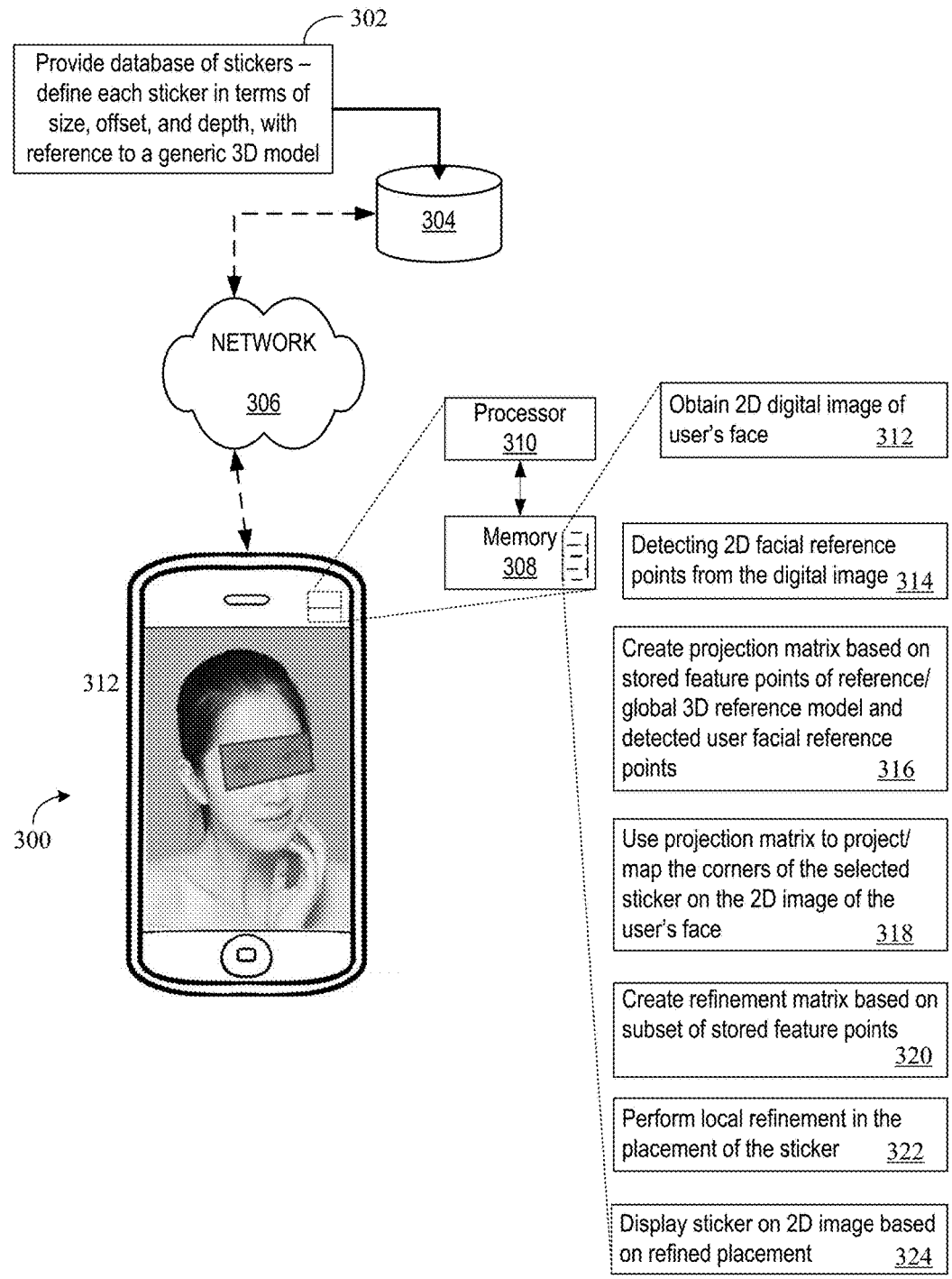
FIG. 8 is a diagram of a mobile phone configured to carry out the inventive method of FIG. 1.

Reference is now made to FIG. 8, which is a diagram of a mobile phone 300 configured to carry out the method illustrated in FIG. 1. This embodiment illustrates an embodiment of the invention, as implemented in a mobile phone 300. As described above, a variety of electronic devices (e.g., phablet, tablet, notebook computer, etc.) could be utilized consistent with the scope and spirit of the invention.

As described in connection with FIG. 1, one or more designers can design 302 a plurality of stickers having defining characteristics that are stored in a database 304. These defining characteristics can be accessed in real time via network 306, or alternatively may be download by an application program running on the mobile phone 300 and stored in a local memory 308. Likewise, the memory 308 may store executable program code that, when executed by processor 310, carries out the various functions and operations of the inventive method. For example, operations such as obtaining a 2D digital image of the user's face 312, detecting 2D facial reference points 314 from the digital image, creating the projection matrix 316, using the projection matrix to map corner points of a selected sticker on the 2D digital image 318, creating a refinement matrix 320 based on stored feature point (or anchor points relevant to the selected sticker), performing a local refinement of the position of the sticker based on the refinement matrix 322, and displaying the sticker on the digital image based on the refined position 324, may all be performed under the control/execution of the processor 310.

As illustrated, the mobile phone 300 may include a general purpose processor and memory to carry out certain embodiments of the invention. Indeed, in the implementation of a mobile phone, it will generally be the processor that is embodied in the mobile phone, and the executable program code will be code suitable for that particular processor. For example, common mobile phones (e.g., Apple's iPhone, Samsung's Galaxy, and Google's Pixel) typically use different processor cores. Therefore, as understood by persons skilled in the art, the compiled program code will be suitably different for each different processor used.

It will be appreciated by persons skilled in the art that the invention realizes a very computationally efficient approach to applying a digital sticker onto a facial region of a digital image (either still image or video image), and to move the sticker along with the digital image (e.g., digital video image) as though the object of the sticker is being worn on the face of the user in the image, or even as if the object of the sticker is a part of the user's face (e.g., whiskers, a pair of horns, etc.).

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

For example, the foregoing description is describe a preferred embodiment using a relatively modest number of facial feature points. Additional feature points could be used and mapped to the reference 3D model. Likewise, the embodiment described above defines the sticker in terms of a four-corner rectangle. However, additional points, defining a more complex geometric shape, could be used. Using more points will often increase accuracy, but will also increase the computational load. The preferred embodiment described above, achieves great computations efficiency, while maintaining comparatively improved accuracy, through the computation and use of the refinement placement operation.

What it claimed is:

1. A method, implemented in an electronic device having a processor, memory, and display,
    the method for displaying a sticker on or around a facial region in a two-dimensional (2D) digital image based on facial positions with predefined facial feature points, the method comprising:
    receiving the two-dimensional (2D) digital image:
    detecting 2D facial feature positions of the predefined facial feature points from the 2D digital image:
    obtaining three-dimensional (3D) facial feature positions from a predetermined 3D reference model:
    calculating a projection matrix from the detected 2D facial feature positions and the 3D facial feature positions, wherein the projection matrix is used for transforming 3D positions to 2D positions:
    obtaining a selected 3D digital sticker comprising a 3D image having a plurality of corners:
    defining at least one anchor point associated with the 3D digital sticker, wherein the at least one anchor point is a subset of the predefined facial feature points:
    identifying at least one 2D anchor position from the detected 2D facial feature positions according to the at least one anchor point:
    identifying at least one 3D anchor position from the predefined 3D facial feature positions according to the at least one 2D anchor point:
    using the projection matrix to project the at least one 3D anchor position to at least one projected anchor position in the 2D digital image;
    calculating a refinement matrix defining a correlation of the at least one projected anchor position and the at least one 2D anchor position;
    using the projection matrix to project the corners of the selected 3D digital sticker to projected corner positions in the 2D digital image;
    using the refinement matrix to refine the projected corner positions in the 2D digital image; and
    displaying the selected sticker on the 2D digital image based on the refined projected corner positions.

2. The method of claim 1, wherein there are four corners that define the selected 3D sticker as a rectangular shape.

3. The method of claim 1, further comprising generating the reference 3D model and storing pre-defined reference points defining certain facial features in a digital storage medium.

4. The method of claim 3, further comprising pre-defining at least one sticker, wherein each predefined sticker is defined by corner points in relation to the pre-defined reference points of the reference 3D model.

5. The method of claim 1, wherein the projection matrix is calculated using an OpenCV library resource.

6. The method of claim 1, wherein the 3D digital sticker is selected by a user choosing the digital sticker from a plurality of pre-defined 3D digital stickers in a database.

7. The method of claim 1, wherein the position of the at least one anchor point is calculated by using a weighted average of the 2D detected facial features.

8. An electronic device for displaying a sticker on or around a facial region in a two-dimensional (2D) digital image based on facial positions with predefined facial feature points, the electronic device comprising:
    a processor; a display; and
    a memory having stored programmed instructions for controlling the processor to perform the following operations:
    receiving the two-dimensional (2D) digital image:
    detecting 2D facial feature positions of the predefined facial feature points from the 2D digital image:
    obtaining three-dimensional (3D) facial feature positions from a predetermined 3D reference model:
    calculating a projection matrix from the detected 2D facial feature positions and the 3D facial feature positions, wherein the projection matrix is used for transforming 3D positions to 2D positions:
    obtaining a selected 3D digital sticker comprising a 3D image having a plurality of corners:
    defining at least one anchor point associated with the 3D digital sticker, wherein the at least one anchor point is a subset of the predefined facial feature points;
    identifying at least one 2D anchor position from the detected 2D facial feature positions according to the at least one anchor point;
    identifying at least one 3D anchor position from the predefined 3D facial feature positions according to the at least one 2D anchor point;
    using the projection matrix to project the at least one 3D anchor position to at least one projected anchor position in the 2D digital image;
    calculating a refinement matrix defining a correlation of the at least one projected anchor position and the at least one 2D anchor position;
    using the projection matrix to project the corners of the selected 3D digital sticker to projected corner positions in the 2D digital image;
    using the refinement matrix to refine the projected corner positions in the 2D digital image; and
    displaying the selected sticker on the 2D digital image based on the refined projected corner positions.

9. The electronic device of claim 8, wherein there are four corners that define the selected 3D sticker as a rectangular shape.

10. The electronic device of claim 8, further comprising generating the reference 3D model and storing pre-defined reference points defining certain facial features in a digital storage medium.

11. The electronic device of claim 10, further comprising pre-defining at least one sticker, wherein each predefined sticker is defined by corner points in relation to the pre-defined reference points of the reference 3D model.

12. The electronic device of claim 8, wherein the projection matrix is calculated using an OpenCV library resource.

13. The electronic device of claim 8, wherein the 3D digital sticker is selected by a user choosing the digital sticker from a plurality of pre-defined 3D digital stickers in a database.

14. The electronic device of claim 8, wherein the position of the at least one anchor point is calculated by using a weighted average of the 2D detected facial features.

\* \* \* \* \*